March 28, 1961      E. L. CALLAHAN      2,976,760
AUTOMATIC TACHEOMETER Filed Oct. 31, 1955      5 Sheets-Sheet 1

INVENTOR.
EZRA LEO CALLAHAN
BY
ATTORNEY.

March 28, 1961  E. L. CALLAHAN  2,976,760
AUTOMATIC TACHEOMETER
Filed Oct. 31, 1955  5 Sheets-Sheet 2

INVENTOR.
EZRA LEO CALLAHAN
BY
ATTORNEY.

United States Patent Office 2,976,760
Patented Mar. 28, 1961

2,976,760

AUTOMATIC TACHEOMETER

Ezra Leo Callahan, 3906 W. 111th Place,
Inglewood, Calif.

Filed Oct. 31, 1955, Ser. No. 543,910

5 Claims. (Cl. 88—2.6)

The present invention relates to a theodolite which automatically measures height vertically and distance horizontally from the theodolite to the object, which object is normally a stadia rod.

At the present time, it is common practice for the surveyor to employ mathematical formulae in the measurement of heights and horizontal distances, and the present invention has for its primary object the elimination of any mathematical formula on the part of the surveyor in determining said heights and distances.

The inventor is aware that attempts have been made to automatically determine both vertical heights and horizontal distances in so-called self-reducing tacheometers and theodolites, this for the purpose of speeding the field work and the elimination of computation of plotted points in the office. Certain designers instead of using fixed stadia lines have utilized two pairs of distant measuring lines on a glass plate which could be moved horizontally in the picture plane of the transit telescope. To measure horizontal distance, the vertical angle had to be read first on a vertical circle, after which the movable glass plate had to be aligned with the vertical cross hair corresponding to this vertical angle. After this was determined, the distance to the stadia rod was a certain factor, usually 100 times the difference in the rod readings. Mechanical means was utilized for the reading of distances and heights, which automatically moved in a horizontal direction when tilting the telescope up and down. However, it was found to be quite impossible to find a design which would synchronize the movement of the diagram with the slightest tilting of the telescope, and which would not have a dead angle in the diagram movement when tilting the telescope from up or down. Various optical arrangements have been proposed so that the actual picture of the individual parts of the diagram is projected in the circle of view of the telescope in such a way that when tilting the telescope, the picture of the diagram moves past the vertical line in a horizontal direction. The diagram consists of a so-called ground circle, along with the horizontal and height curves. The height curve is subdivided into four sections to be used with different multiplying constants or factors and the image of the curves appears in the field of view of the telescope, with rod readings taken from these diagram curves. However, the curves present difficulties to the semi-skilled, and sometimes the skilled surveyor and cause false readings. The vertical cross hair must be lined within the limits of the rod markings. This is a handicap to the surveyor.

The present invention has among its objects a construction which entirely eliminates mechanical movements and curved lines calculated on a diagram which is viewed in the plane of the cross hairs of a telescope, which lines cross markings on the stadia rod in the measuring of heights and horizontal distances.

The invention has for a further object a theodolite adapted to measure horizontal and vertical distances in which the necessity for aligning the vertical cross hair of the telescope on the stadia rod within the confines of the rod markings, is unnecessary, in order to obtain accuracy of reading.

A further object is the provision of a theodolite wherein the vertical and horizontal distances may be read directly on the same stadia rod for any position of the telescope, and wherein no arcs, tables, charts, slide rules, corrections, calculations, or data of any kind are required.

A further object is the provision of a theodolite which is free from parallax.

A further object is the provision of an automatic tacheometer, the principle and means for accomplishing the same being readily adaptable to existing theodolites or transits.

Other objects include a self-reducing or automatic tacheometer of simple construction, fool-proof in operation, efficient, and accurate, and which is generally superior to devices now known to the inventor.

With the above mentioned and other objects in view, the invention consists in the novel and useful provision, formation, construction, association, and relative arrangement of parts, members and features, all as shown in certain embodiments in the accompanying drawings, described generally, and more particularly pointed out in the claims.

In the drawings:

Figure 5 is a fragmentary elevation of a stadia rod which may be utilized in the practice of the present invention, Figure 5ª is a fragmentary, enlarged elevation of a portion of the stadia rod shown in Figure 5, with double the number of markings of Figure 5, Figure 5ᵇ is a fragmentary elevation, on an enlarged scale, of a modified form of marking for stadia rods, Figure 9 is a further exemplification by way of perspective view of the glass diagram of Figure 8, together with lenses, prisms, and beam splitters for passing two pencils of light from the diagram to the reticle plate.

Figures 10 and 11 are representative of different curves on the glass diagram for the measurement of vertical and horizontal distances, and, Figure 12 is a sectional view, on an enlarged scale, on the line 12—12 of Figure 9.

Referring now with particularity to the drawings, and specifically to Figures 6 to 12, inclusive, I have shown the specific means of the invention associated with a theodolite for the measurement of horizontal distances and vertical elevations when the theodolite is utilized in conjunction with a stadia rod. I have no particular transit construction in mind and, as a consequence, the transit illustrated in the figures just referred to may be considered as any type of modern transit to which my invention may be adapted. Hence, I shall refer to the transit shown in Figures 6 and 7 briefly as to its construction, referring the reader to any standard textbook on surveying or various catalogues issued by transit manufacturers, for the detailed construction of a transit. The transit shown in Figure 7 includes a telescope, here designated as 1, and which telescope is of the internal focusing type provided with the usual objective lens mount 2, a telescope barrel 3, a focusing means 4, externally controlled by a pinion head 5, which means longitudinally moves the draw tube 6 within the barrel and which draw tube is provided with a focusing lens mount 7. A reticle made of clear thin optically flat glass on which is etched or engraved a horizontal cross line and a vertical line at the center or containing spider, glass, or platinum hairs, is provided at 8, and at the rear thereof is an eye-piece tube 9, within which tube is positioned the usual lenses and mounts, which also includes the eye-piece focusing lens and mount. In the claims the words "cross hairs" are intended to cover any of the forms mentioned above or equivalents thereof. The telescope axle 10 (see Figure 6) is on the horizontal axis of the telescope and is not symmetrical with respect to the longitudinal axis of the telescope. Thus, in Figure 6, one-half of the axle 10ᵃ is shown as of tubular form, which end is supported in a suitable bearing 11 carried by a standard 12, the standard being supported on the vernier plate 13. The usual clamp 14 is provided for this portion of the axle, together with a tangent screw at 15 for locking and adjusting the axle.

The opposite side of the said axle takes the form of a casing or housing, hereinafter termed the axle housing 16, which not only aids in the support of the telescope, but houses the various elements entering into the present invention. The axle housing 16 is of elongated form, and is secured to or integral with the barrel 3. It will be noted from Figure 7 that this axle housing is spaced outwardly from the periphery of the barrel and extends to a point just forwardly of the reticle 8, the said barrel being interrupted at 17 to afford communication between the interior of the housing and to the space within the telescope barrel included between the reticle 8 and the lens mount 7. A standard 18, of lesser height than standard 12 and paralleling standard 12, supports the axle housing 16 and gives rigidity to the mounting for the telescope. The said axle housing 16 is provided with a circular or circumferential bearing surface 19 which, in turn, has bearing engagement with the inner curved surface of a member 20 which is part of standard 18. The member 20, in turn, is adjustably secured, in any approved manner, such as by screws 21, to an angular sectional ring 22, a portion of the periphery of one leg thereof being inclined, as shown at 23, for contact with a like formed leg on an annular member 24. Member 24 is internally threaded at 25 to receive an annular nut 26 for holding members 22 and 24 in juxta locked position, allowing slight circular movement as required by bubble 34. The annular member 24 is adapted to carry a portion of the present invention, to-wit, the annular diagram 27, and to hold said diagram against rotation when the transit telescope is rotated on its horizontal axis. Annular member 24 has an annular extension at 28 adapted to support a casing member 29. A casing 30 is secured by means (not shown) to housing 16.

As usual in transits, level vials are provided at 31 to 34, inclusive, and a tangent screw 35 is provided for the diagram 27. In the present adaptation of the invention, the vertical circle 36 is secured to support 37, while a vertical circle vernier 38 is adjustably secured to casing 29. The vertical circle support 37 is adjustably secured to member 30 by any appropriate means, such as screws 39. It is intended that the vertical circle vernier should be observed through a dust-proof glass covering. There is a dust-proof seal between 37 and 29, allowing 37 to freely rotate.

Figure 8:
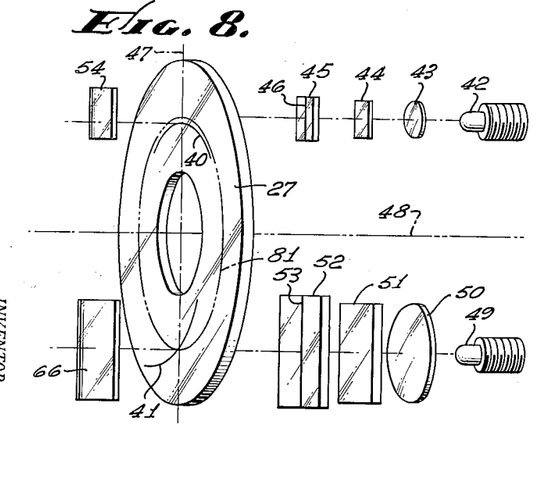
Figure 8 is a perspective view of certain elements utilized in the practice of the invention, and showing means for the passage of light pencils through certain lenses, and a glass diagram.

In the present invention, I utilize an optical system for the determination of both horizontal distances and vertical heights. Thus, on the annular diagram 27 (Figure 8), I provide curves 40 and 41. The curve 40 is known as the horizontal distance curve, while curve 41 represents vertical elevations, and these curves are positioned relative to a reference or zero line 81. Preferably the diagram 27 has optically flat surfaces and said diagram is opaque with the curved lines 40 and 41 being clear or transparent when viewed from either surface of the diagram. I will consider first the use of the horizontal distance curve 40, as shown in Figure 8. At one side of the diagram, and arranged in axial alignment is a source of light 42, which may take the form of a small focusing incandescent bulb, a spherical lens 43, a cylindrical lens 44, and an optically flat glass member 45 having an opaque background and provided with a clear vertical center line 46, which line is adapted to bisect the curved line 40 when the telescope is in a horizontal position but rotates with the telescope about axis 48. The contiguous faces of the diagram 27 and member 45 carry the lines 40 and 46, respectively, in order to avoid parallax when light is passed through the intersecting point therebetween. While the various members, in the order stated, as shown in Figure 8, are shown a considerable distance apart, this is for illustration only, as the member 45 is as close to the surface of the diagram as it is possible to position the same. In the showing of Figure 8, the line 47 indicates a vertical plane at substantially right angles to the horizontal axis line 48 and parallel with it, and dividing the curved line 40 into equal lengths when the telescope is in a horizontal position. The clear line 46 lies in the vertical line or plane 47 when the telescope is in a horizontal position but rotates with the telescope about its horizontal axis 48. The axis line 48 is the center of diagram 27 and the horizontal axis of the telescope.

The optical arrangement for the line 41 is identical with that for the line 40, with the exception that the elements are larger as the curve 41 covers a greater area of the diagram, and the said curve must at all times be bisected by a reference line 81. For the lower half of the diagram, I provide a source of illumination 49, lenses 50 and 51, and plate 52 having line 53. As previously set forth, the diagram does not move with telescope movement but the optical system just described does rotate when the telescope is rotated. On the opposite side of the diagram 27, and for the lens system shown at 43 to 45, inclusive (see Figure 6), is a cylindrical lens 54, prism 55 of the Porro type, in that light enters and leaves at right angles to the hypotenuse and is reflected at each of the shorter faces, a totally reflecting prism 56 for receiving the emergent light from prism 55 and for reflecting the light to a beam splitter 57. The beam splitter constitutes a pair of prisms 58 and 59 which are cemented together and provided at the cemented surface with a dichroic coating. As shown, the beam of light is reflected to the 45° surface 60 (see Figure 9) of prism 59 from the dichroic surface to rhombic prism 61 (Figure 9), thence to Porro prism 62 (Figure 9), and from Porro prism 62 through lenses 63 and 64 to beam splitter 65, having a construction like beam splitter 57 without the dichroic coating, but having non-selective reflecting characteristics for color, such as provided by an evaporated metallic coating, which is positioned within the telescope barrel so as to direct the rays of light from said beam splitter into the reticle 8. Beam splitter 65 also allows the passage of light rays from the objective lens 2 and focusing lens 7 to the recticle 8.

Figures 9, 10, 11, 12:
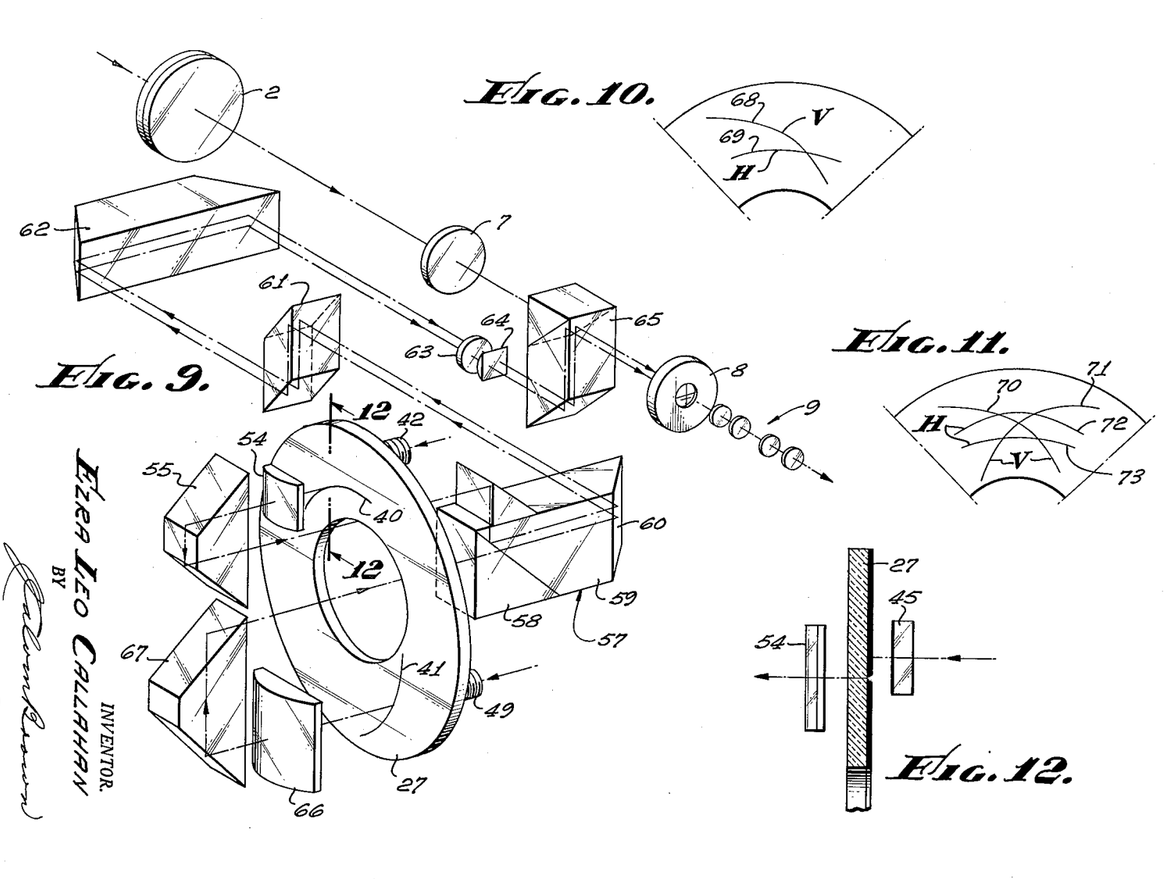

As shown in Figure 9, the arrangement of the lens system for the curve 41 is similar to that just described for the curve 40 and the rays of light directed through said curve are directed through the cylindrical lens 66 to the Porro prism 67, thence to the beam splitter 57. It will be noted, upon observation of Figure 9, that the rays of light move in the light paths from both the distance and the height curves to the reticle 8.

The arrangement is such (see Figure 8) that the thin lines 46 and 53 which intersect the curves 40 and 41, respectively, and rotate with the telescope about its horizontal axis 48, produce minute points of light where the lines 46 and 53 cross or intersect the curved lines 40 and 41, at any angle of the telescope. The cylindrical lenses 44 and 51, respectively, spread the light from sources 42 and 49 over the plates 45 and 52 so as to illuminate the same and specifically the clear lines thereon. The cylindrical lenses at 54 and 66 on the opposite side of the diagram change the minute light points or stars from the intersection of 46 and 40 and 53 and 41 into parallel straight lines of light, and these lines, which are of considerable length, are then, so far as the light rays are concerned, passed through the prism and lens systems which have been described, to finally provide a green and a red line, the result of having passed through the dichroic surface of beam splitter 57. The action of a dichroic coating is well known, in that reflected light thereon appears green, while non-reflected light appears red or yellowish. Finally, the two straight lines form horizontal phantom light lines adjacent to, coincident with, or to one side of and parallel to the horiontal cross hair of the reticle in the plane of said cross hair, which is normal to the longitudinal axis of the telescope, thus having no parallax, and it is by reading the horizontal cross hair of the reticle with respect to the position of these phantom horizontal straight lines and the lines on a stadia rod, that elevation and horizontal distances are measured, as set forth in the statement of operation.

To briefly recapitulate, the rocking of the telescope on its horizontal axis will, of course, rock the axle member 10a and the portion 16. In so rocking the telescope, the vertical circle support 37 will rotate as will the casing 30, which is connected to the vertical circle support and overlies the prisms 55 and 67. The diagram 27 does not rotate, as it is held by member 24, which is secured to the standard 18 through members 20 and 22. The lens system, however, does rotate with movement of the vertical circle and the transit. While the means whereby the various lenses are supported are not detailed, still it is obvious, upon inspection of Figures 6, 7, 8 and 9 that both the barrel of the telescope and the member 16 suitably support, in any desired manner, the lenses 43, 44, the plate 45, together with the lenses 50, 51, and plate 52, with the sources of illumination 42 and 49, on one side of the diagram 27 as well as supporting the beam splitter 57, prisms 61, 62, and lenses 63, 64, and beam splitter 65. On the opposite side of the diagram, the prisms 55 and 67, together with lenses 54 and 66, may be supported by suitable mounts carried by casing 30. The means of support for the various lenses and prisms is not a part of the present invention, as said means may vary to a wide extent, and any suitable means is intended.

I may eliminate the use of two separated curves and the lenses, such as shown in Figures 8 and 9, at 50, 51, plate 52, lens 66, and prism 67, together with the source of light 49, by providing diagrams of the type shown in Figures 10 and 11.

In Figure 10, I have provided the two curves on the upper part of the diagram, as shown at 68 and 69, the curve 68 being equivalent to elevation curve 41, while curve 69 represents horizontal distance and is equivalent to curve 40. As pointed out hereinafter, in the statement of the operation, that form of the diagram shown in Figure 10 may be used, requiring only one quadrant of diagram 27 with its lens system. It is used for reading the upper and lower halves of a stadia rod separately, and considerably reduces the expense of a theodolite incorporating the invention. In Figure 11, the entire stadia rod is read, and the upper half of the diagram is provided with four lines, as shown at 70 and 71, for the elevation and at 72 and 73 for the horizontal distance.

Figures 5, 5A, 5B:
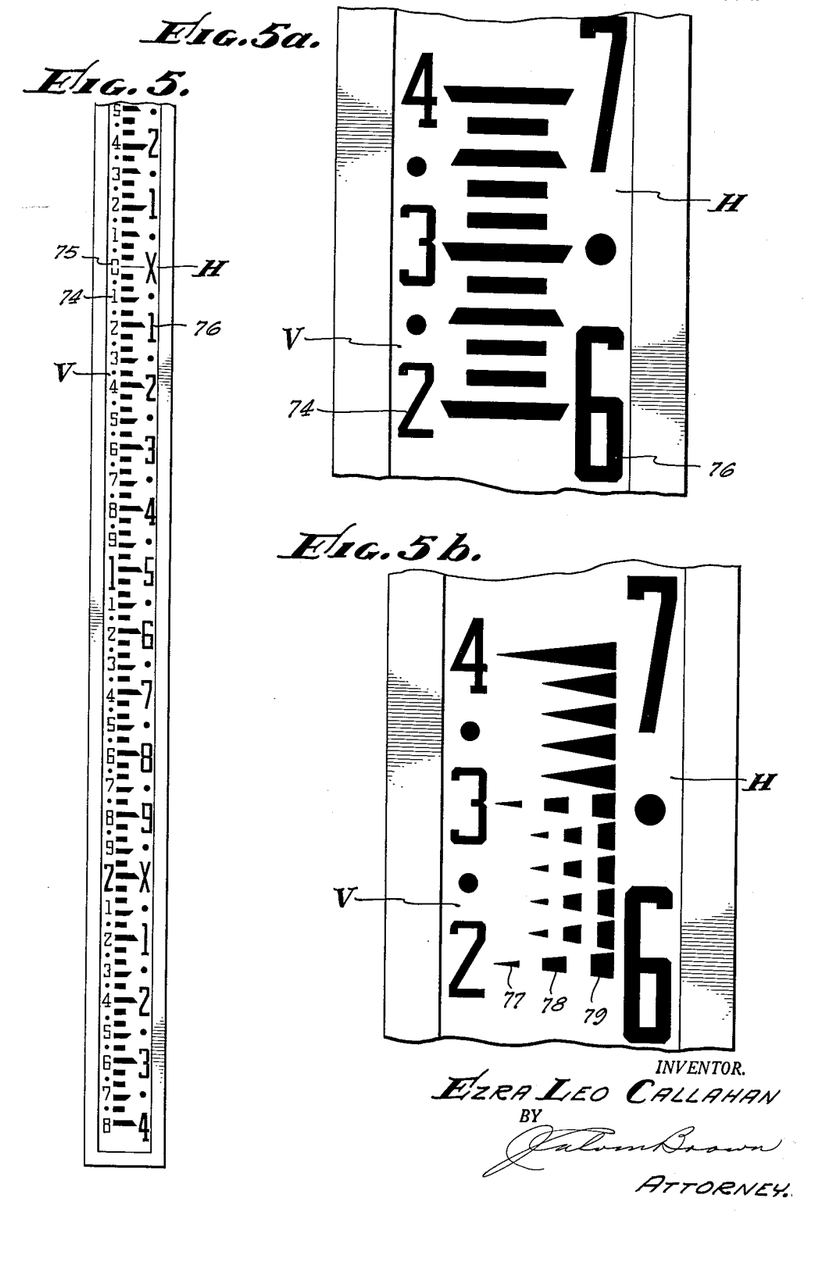
Figure 6:
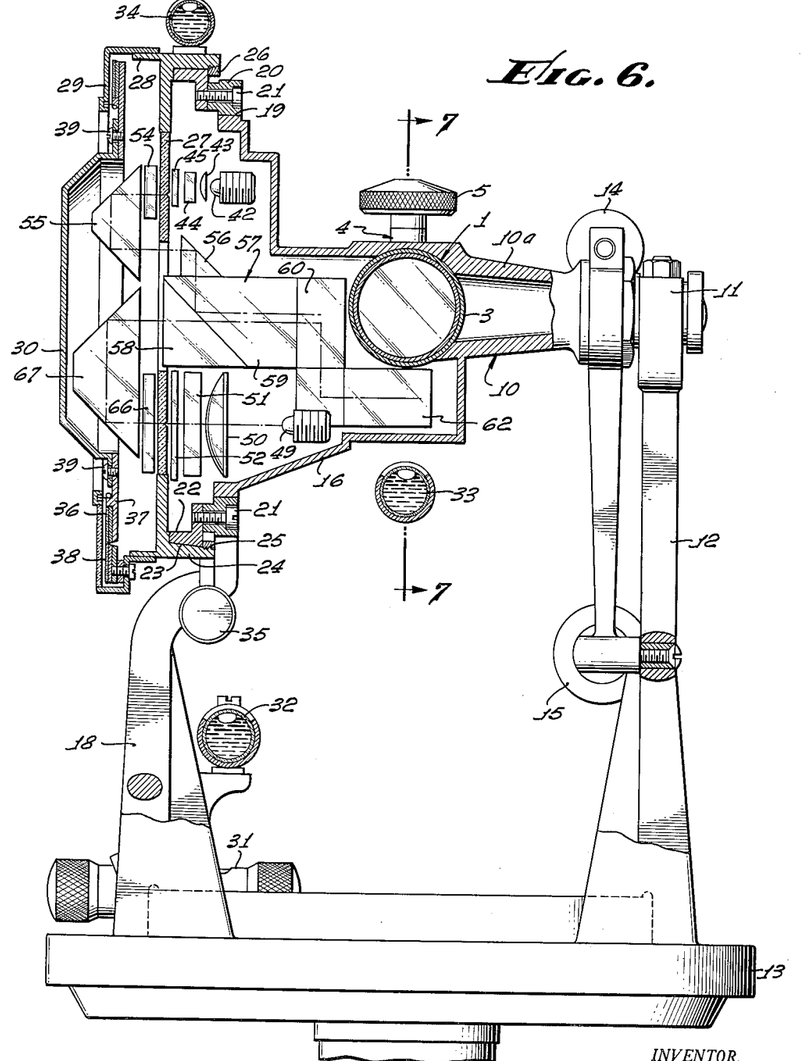
Figure 6 is an elevation, partly in section, of a theodolite incorporating the invention.
Figure 7:
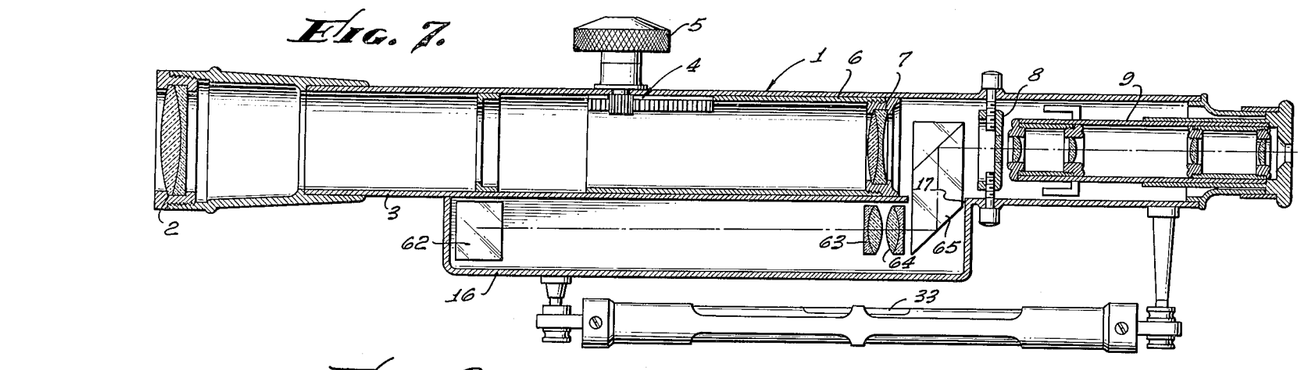
Figure 7 is a sectional view on the line 7—7 of Figure 6.

In Figures 5, 5a and 5b, I have illustrated various types of stadia rods which may be utilized in the practice of the present invention. These stadia rods are for illustration only and not by way of limitation of the invention to any particular type of stadia rod. The marks may be dark with light background or light with dark background.

In Figure 5, the stadia rod is provided with graduations 74 illustrative of elevation V with respect to a zero marking 75, while numbered graduations are provided at 76 for the measurement of horizontal distances H. This type of stadia rod uses either the upper half from the zero graduation 75, or the lower half thereof, for the measurement of heights and horizontal distances. As shown, the rod interval on the H scale is multiplied by 100 to obtain the actual horizontal distance, while the vertical distances are obtained by multiplying the rod interval on the V scale by 100. Thus, if the number "5" is read on the H scale by the moving H line, the horizontal distance is $5 \times 100 = 500$ feet, and opposite the "5" on the V scale is the numeral "1," which indicates that if the moving V line cut this figure, the elevation would be $1 \times 100 = 100$ feet. The marks on the stadia rod in Figure 5 are twice the width vertically of those in Figure 5a, thus making easier readings for long sights.

In Figure 5a, a stadia rod is shown in fragment, wherein the upper and lower halves of the rod are used separately. Each graduation or mark represents $.05 \times 100 = 5$ feet horizontal distance on the H or distance scale on the right, and $.01 \times 100 = 1$ foot vertical elevation on the V or vertical scale on the left.

In Figure 5b, upper portion, the graduations are of pennant form and read to the same scale as Figure 5a. The rod interval $\times 100$ from point to point of the pennants represent 10 feet horizontal distance $= .1 \times 100$ on the horizontal scale and 2 feet vertical elevation $= .02 \times 100$ on the vertical scale.

In Figure 5b, lower portion, the rod interval $\times 100$ from point to point represents 10 feet horizontal distance on the horizontal scale and 2 feet vertical elevation on the vertical scale the same as in the upper portion. The pennants in the lower portion are divided into vertical strips, three of one color and two of another color. The width of each strip, measured vertically, $\times 100$ represents one foot horizontal distance on the horizontal scale as measured by the moving horizontal H phantom cross line in the reticle, and two-tenths (.2) feet vertical elevation on the vertical scale as measured by the moving horizontal vertical V phantom cross line in the reticle. The H and V lines are stationary when the telescope is locked in position for a reading.

The first vertical strip on the left is 77, the second to the right of 77 is 78, and the second to the right of 78 is 79 for reference.

When the horizontal H line moves vertically from the point of the pennant at the left side of 77 to the upper point of the right side of 77, it has measured $.01 \times 100 = 1$ foot horizontal distance on the horizontal scale. Similarly, when the horizontal H line has moved vertically to the upper point at the right of 79, it has measured $.01 \times 5 \times 100 = 5$ feet horizontal distance on the horizontal scale. The vertical strips can be read to half their width, thus giving a reading to one-half foot horizontal distance on the horizontal scale.

When the vertical V line moves vertically from the point of the pennant at the left side of 77 to the upper point of the right side of 77, it has measured $.002 \times 100 = .2$ (two-tenths) feet vertical elevation on the vertical scale. Similarly, when the vertical V line has moved vertically to the upper point at the right of 79, it has measured $.002 \times 5 \times 100 = 1$ foot vertical elevation on the vertical scale. These vertical strips can be read to half their widths, thus giving a reading to .1 (one-tenth) foot vertical elevation on the vertical scale.

Figure 1:
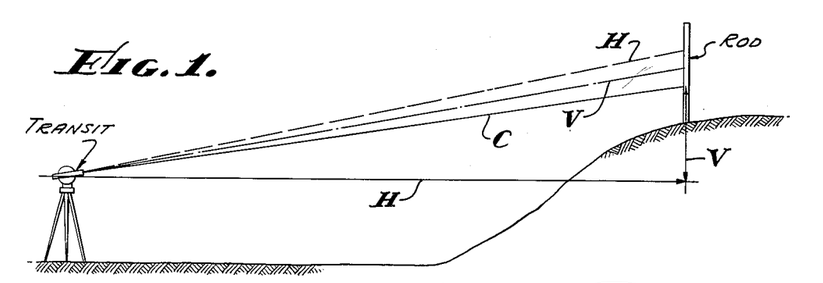
Figure 1 is a diagrammatic view illustrating the use of a transit and a stadia rod in the measuring of horizontal distances and vertical heights, and which view is utilized as explanatory of the invention.
Figures 2, 3, 4:
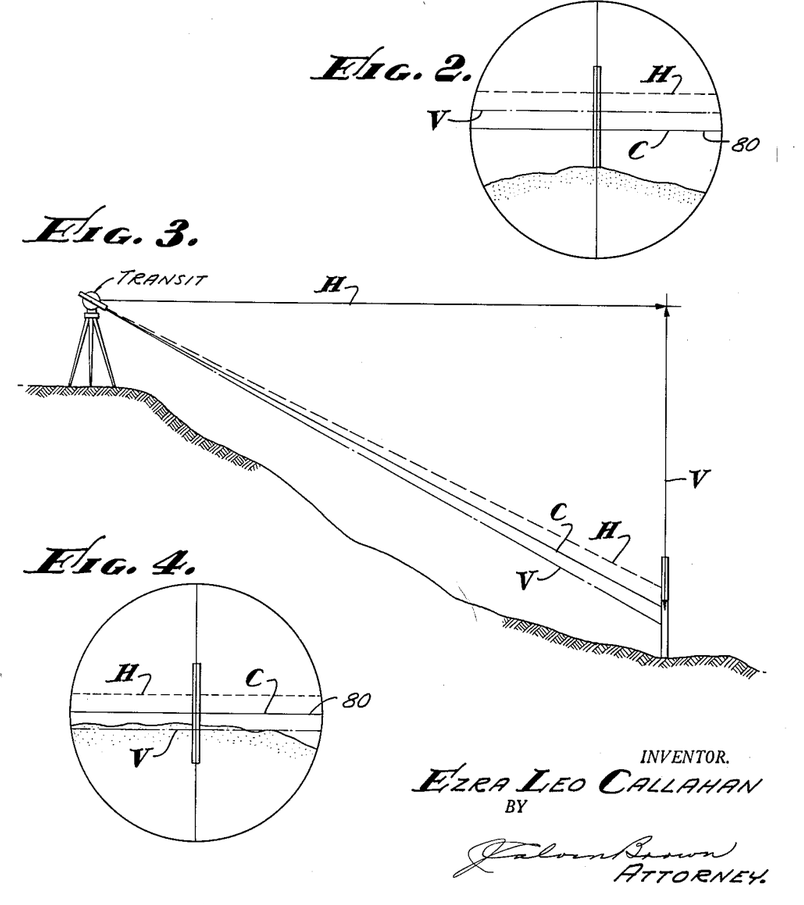
Figure 2 is an enlarged view showing a stadia rod and illustrating the center line of said stadia rod with lines llustrating vertical heights and horizontal distances.
Figure 3 is a view illustrating the use of a transit in the measuring of horizontal distances and vertical descents relative to the transit.
Figure 4 is illustrative of the position of the stadia rod shown in Figure 3.

Figures 1 to 4, inclusive, will be utilized in the statement of the operation of the invention, but preliminarily, in Figure 1, the transit has been positioned so as to measure an elevation, and horizontal distance. The appearance of the reading on the stadia rod will be that of Figure 2. With respect to the stationary horizontal cross hair or zero line of the stadia, which is indicated at 80, in this instance, both the elevation and the horizontal distances are read above the cross hair 80. In Figure 3, the telescope has been pointed downwardly to make a reading, and it is noted that the elevation is read with respect to the horizontal cross hair below said cross hair, while the horizontal distance is read above the cross hair. Figure 4 illustrates the view obtained when looking through the telescope.

The operation, uses and advantages of the invention just described are as follows:

The various lenses making up the optical system are, of course, coated to overcome internal reflection. The present invention utilizes phantom straight lines whose horizontal images move in the plane of the stationary cross hair in the reticle for the reading of both elevations and horizontal distances. For this purpose, I define a phantom line as one that is seen in superposition with a telescopic field and produced by an auxiliary optical system for said line, such that the image of the line formed by the auxiliary system and the image formed by the telescopic system are brought into coincidence through the use of a beam splitter. When I utilize the optical system illustrated in Figure 9, wherein the horizontal curved line 40 is in the upper quadrant of the diagram and the vertical or elevation curve 41 is in a lower quadrant, the use of a dichroic coating on the beam splitter will separate the two lines by distinguishing colors—green in one instance, and red in the other. However, when diagrams of the form shown in Figures 10 and 11 are utilized, both lines are in the same quadrant for indicating elevations and horizontal distances, and it then becomes necessary to utilize colors in the making of these lines, so that the lines may be distinguished, or suitable means may be utilized for varying the widths of the respective lines so that they may be distinguished by the transit man.

It is assumed that the transit man will properly level his transit and that the rod man will hold the stadia rod plumb by utilizing the usual leveling means. In the optical system depicted in Figures 6, 7, 8, and 9, the small star or point of light for each intersection of curve 40 and line 46 and curve 41 and line 53 for each position of the telescope will be changed into straight lines by the cylindrical lenses 54 and 66. These straight lines will be colored by the dichroic coating on the first beam splitter 57, and in turn appear as separate horizontal phantom lines in the same plane as the stationary horizontal cross hair in reticle 8 which is at right angles to the longitudinal axis of the telescope. The vertical cross hair in the reticle need not be centered so as to cut the markings on the stadia rod as the horizontal lines, which appear as phantom lines, will cut the graduations of the stadia rod when the stadia rod appears at any point in the field of view of the telescope. Hence, it is necessary only for the transit man to read the horizontal lines with relation to the stationary horizontal cross hair of the telescope. The phantom lines, indicating elevation and horizontal distance, are true horizontal lines and not curves, which, therefore, renders readings by the transit man quite accurate. The transit man, referring to Figure 2, centers the horizontal stationary cross hair of the reticle 8 of the transit on the zero indication 75 for that type of stadia rod shown in Figure 5. In this instance, the elevation phantom line will appear above the cross hair, as will likewise the distance phantom line. The transit man, having adjusted the telescope in accordance with that of Figure 1, readings are made directly on the transit rod. The distance reading is read on the scale of transit rod shown in Figure 5, at 76, while the elevation is read on the scale 74. In the case of Figure 3, the cross hair of the reticle is placed on zero indication of the stadia rod, Figure 5, shown at 75, and the height of descent is read below the zero indication while the horizontal reading is above the zero reading (see Figure 4).

When using the form of diagram shown in Figure 10, two small stars indicative of the elevation and horizontal distance will appear where line 46 intersects curves 68 and 69 for any position of the telescope, which are converted into straight lines either of different widths or of different colors to distinguish the same, and these lines become horizontal at the reticle and are read in conjunction with the stationary horizontal cross hair of the reticle, which cross hair is placed on the zero reading 75 of the stadia rod of the type of Figure 5.

That form of diagram shown in Figure 11 utilizes two horizontal distance curves and two elevation curves resulting in four stars which are converted into two straight lines for elevation, and two straight lines for horizontal distance. The two straight lines, which become horizontal at the reticle, are read with respect to the stationary horizontal cross hair of the reticle of the telescope which is focused on the zero stadia rod marking 75. The lower horizontal H line is read with respect to the stadia rod below a zero indication on the stadia rod, and the upper horizontal H line is also read with respect to the zero indication and the two readings added to obtain the horizontal distance. The same procedure is followed as to elevation. A stadia rod at double the scale of Figures 5, 5ª and 5ᵇ should be used for the above.

With the system and means illustrated and described, I have provided a transit wherein, with great accuracy, it is possible to measure both horizontal distance and elevation, utilizing a stadia rod by a direct reading of the indications of the stadia rod with respect to horizontal phantom lines which appear in the circle of view of the transit. It is perhaps unnecessary to state how the curves which appear on the diagram indicating horizontal distances and elevations are obtained. However, for those interested in the academic principles and practice of surveying, reference is made to a textbook on Surveying, by Charles B. Breed and George L. Hosmer, of the Massachusetts Institute of Technology, on the Principles and Practice of Surveying, pubished by John Wiley & Sons, Inc. It is pointed out in the textbook referred to, under the chapter on the "Stadia Method," that certain formulae must be utilized for inclined sights. The authors point out that on inclined sights, when the rod is plumb, the vertical and horizontal distances cannot be found simply by solving a right triangle, and, accordingly, tables have been worked out for determining both horizontal distances and vertical heights which, of course, utilizes trigonometry. The curves for the diagram are, therefore, worked out from these tables and calculations, which take into consideration the axis of the telescope and the point on the rod where the horizontal cross hair of the reticle cuts it.

The following is standard information and data for the stadia method of locating points in which distances are measured by observing through the telescope of a transit, the space, on a graduated rod, included between two fixed horizontal hairs called stadia hairs. This space is called the rod intercept or interval (R.1.). The distance between the stadia hairs is designated by the letter $i$. The focal length of the objective lens of the telescope is designated by the letter $F$. The distance from the objective lens to the center of the transit is designated by the letter $c$. The vertical angle of the telescope is designated by the Greek letter $\alpha$.

The horizontal distance (H) from the center of the transit to the stadia rod equals $F/i \times R.1. \times \cos^2 \alpha$. $F/i$ is usually made equal to 100. Therefore $$H = 100 \times R.1. \times \cos^2 \alpha$$

The H figures in the Gurley Manual, published by W. and L. E. Gurley Co., Troy, New York, are $\cos^2 \alpha \times 100$.

Therefore, the horizontal distance equals the rod interval times the figures in the table.

In internal focusing transits, the stadia constant $$F+c=0$$

The vertical elevation V from the height of the transit to the point on the stadia rod intersected by the center cross hair equals $F/i$ times the rod interval times the sin times the cos of the vertical angle of the telescope.

$$V = 100 \times R.1. \times \sin \alpha \times \cos \alpha$$

The V or difference of elevation figures in the Gurley Manual are $\sin \alpha \times \cos \alpha \times 100$. Therefore, the vertical elevation equals the rod interval times the figures in the table.

There are refinements in the above formulas when using the upper portion of the rod interval above the center cross hair and the lower portion of the rod interval below the center cross hair separately. These corrections are well known in stadia calculations but seldom used.

The calculations for the required distance between the standard horizontal stadia cross hairs in the reticle are also common practice among various manufacturers.

From the above information and data, the distances between the stationary, horizontal or zero cross hair in the reticle of this invention and the horizontal H and vertical V moving phantom lines in the same plane as the zero cross hair, which is normal to the longitudinal axis of the telescope, have been calculated as well as their corresponding points on the horizontal distance and vertical elevation curves 40 and 41 on diagram 27 of Figure 8. The distances between the stationary zero cross hair and the moving horizontal H and vertical V phantom lines in the reticle are a calculated proportion of the spacing of standard stadia horizontal cross hairs, for each vertical angle of the telescope as it pivots about its horizontal axis.

As stated, the curves for horizontal distance and elevations have been worked out, and, accordingly, the present inventor does not attempt either to give the formulae or the tables, as this is a matter of common knowledge.

It is evident that the present inventor, by changing the small pin points or stars of light into straight horizontal phantom lines in the circle of view of the telescope rather than curved lines, has provided an instrument which will afford great accuracy and ease in the reading of elevations and distances, and an instrument wherein the vertical cross hair of the reticle need not be considered, as must be the case in existing transits now known to the inventor. The vertical cross hair need only be used for measuring angles in azimuth and other purposes in common surveying.

I claim:

1. The combination in an automatic tacheometer, of a telescope having a horizontal axis and a reticle with a horizontal cross hair on the optical axis of the telescope, a standard for mounting the telescope to rotate about its horizontal axis, a diagram provided with an opaque background broken by a non-arcuate light transmitting curve, said diagram being fixedly mounted on said standard so as to be unaffected by the rotation of the telescope about its horizontal axis and to remain normal to the horizontal axis of the telescope and parallel to the plane in which the longitudinal axis of the telescope moves, a source of light to one side of the diagram and movable with the telescope, a first group of optical means for transmitting light from said source to said light transmitting curve as a straight line radial to the horizontal axis of the telescope to produce a pin point of light on the opposite side of the diagram moving along said light transmitting curve as the telescope rotates and a second group of optical means for transmitting said pin point of light to the reticle as a phantom line parallel to and in the same plane as the horizontal cross hair in the reticle, said optical means all being mounted to rotate with the telescope as the latter turns about its horizontal axis, said light transmitting curve being of calibrated shape so that the phantom line varies in position as the telescope is rotated, moving uninterruptedly and continually in the focal plane and field of view of the telescope, whereby when the tacheometer is used with a suitable stadia rod, the rod can be read at any point in the field of view.

2. The combination in an automatic tacheometer of a telescope having a horizontal axis and a reticle with a horizontal cross hair on the optical axis of the telescope, a standard for mounting the telescope to rotate about its horizontal axis, a diagram provided with an opaque background broken by a plurality of non-arcuate, light transmitting curves, said diagram being fixedly mounted on said standard transverse to and normal to the horizontal axis of the telescope, a plurality of spaced sources of light located on one side of the diagram and movable together in arcs as the telescope revolves, optical means located between each source of light and the diagram for transmitting light from the proximate source to the proximate light transmitting curve as a straight line radial to the horizontal axis of the telescope to produce a pin point of light on the opposite side of the diagram and moving along said curves as the telescope rotates, optical means for transmitting said plurality of pin points of light to the reticle as phantom lines parallel to and in the same plane as the horizontal cross hair in the reticle, all of said optical means being mounted to rotate with said sources of light as the telescope turns about its horizontal axis, whereby when the automatic tacheometer is used with a suitable stadia rod the rod can be read at any point in the field of view of the telescope.

3. The combination of claim 2 in which the second optical means includes means for distinguishing the phantom lines from each other.

4. A transit theodolite including a telescope having a horizontal axis and a reticle provided with a horizontal cross hair on the optical axis of the telescope, a diagram provided with a light transmitting curve through an opaque background relative to an arcuate reference line whose center coincides with the horizontal axis of the telescope which diagram is normal to the horizontal axis of the telescope and parallel to the longitudinal axis thereof, a standard for mounting the horizontal axis of the telescope, means securing said diagram to said standard against movement when the telescope is rotated about its horizontal axis, a source of light on one side of said diagram, an optical member having an opaque background broken by a light transmitting straight line radial to the horizontal axis of the telescope, adjacent the diagram and between the source of light and the diagram to transmit a line of light intersecting the light transmitting curve of the diagram to produce a pin point of light on the opposite side of the diagram, said pin point of light varying in distance from said arcuate reference line as the intersection of the radial line traverses the curve as the telescope is rotated about its horizontal axis, optical means for transforming said pin point of light into an elongated straight line, and further optical means for transmitting said elongated straight line of light to the reticle to appear as a phantom line parallel to and in the same plane as the horizontal cross hair in said reticle which plane is normal to the longitudinal axis of the telescope, all of said optical means moving with the telescope as it rotates about its horizontal axis, said curve being of predetermined shape so when the theodolite is used with a suitable stadia rod the phantom line in the reticle will intercept the proper rod interval on the vertical stadia rod which when multiplied by a predetermined coefficient gives the correct horizontal distance from the center of the instrument to the vertical stadia rod or the correct vertical distance from the horizontal level line of sight to the point on the vertical rod intercepted by the reference horizontal cross hair in the reticle for any angle of the line of sight of the telescope, whereby said straight parallel line of light moves uninterruptedly and continually in the focal plane and field of view of the telescope as the telescope rotates on its horizontal axis.

5. The theodolite of claim 4 in which the diagram is an annular member having a transparent horizontal distance curve on one side of the center of the diagram and a vertical distance curve on the other side of the center of the diagram, also a second source of light and a second optical system for the additional light and the additional transparent curve, in which the two pin points of light are returned through the center of the annulus and are then transmitted by members of the second optical group as parallel lines, whereby when the theodolite is used with a suitable stadia rod, the rod interval intercepted between the cross hair and one phantom line multiplied by a chosen coefficient gives the proper horizontal distance and the rod interval intercepted between the cross hair and the other phantom line multiplied by a chosen coefficient gives the proper vertical distance.

References Cited in the file of this patent

UNITED STATES PATENTS

| | | |
|---|---|---|
| 1,023,373 | Graham | Apr. 16, 1912 |
| 1,743,979 | Radford et al. | Jan. 14, 1930 |
| 1,953,299 | Grant | Apr. 3, 1934 |
| 2,190,569 | Macgill | Feb. 13, 1940 |
| 2,358,084 | Mihalyi | Sept. 12, 1944 |
| 2,360,822 | Altman | Oct. 24, 1944 |
| 2,401,697 | MacNeille et al. | June 4, 1946 |
| 2,401,706 | Mihalyi | June 4, 1946 |
| 2,406,807 | Colbath | Sept. 3, 1946 |
| 2,678,621 | Proctor | May 18, 1954 |

FOREIGN PATENTS

| | | |
|---|---|---|
| 18,721 | Great Britain | Aug. 15, 1912 |
| 554,731 | Germany | July 13, 1932 |
| 919,393 | Germany | Oct. 21, 1954 |
| 864,646 | France | Jan. 27, 1941 |
| 415,102 | Italy | Sept. 18, 1946 |